Figure 1:
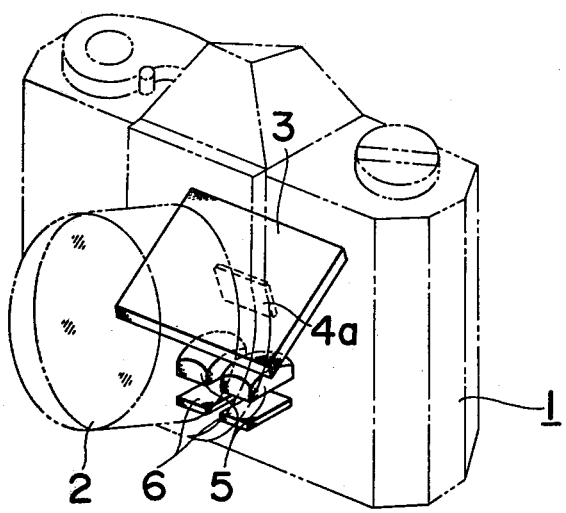

United States Patent [19]

Saito et al.

[11] 4,189,218

[45] Feb. 19, 1980

[54] APPARATUS FOR DETECTING FOCAL POINT

[75] Inventors: Kaneo Saito, Hino; Michio Yagi, Hachioji; Kunio Nakajima, Fuchu; Takehiko Hamaguchi, Hauchioji, all of Japan

[73] Assignee: Konishiroku Photo Industry Co., Ltd., Tokyo, Japan

[21] Appl. No.: 801,547

[22] Filed: May 31, 1977

[30] Foreign Application Priority Data

Jun. 1, 1976 [JP] Japan ................................. 51-64401

[51] Int. Cl.² .......................... G03B 3/10; G03B 7/08
[52] U.S. Cl. ........................................ 354/25; 354/31
[58] Field of Search .................. 354/25, 152, 195, 198, 354/56, 31; 250/201, 204, 578, 234; 356/4; 352/140

[56] References Cited

U.S. PATENT DOCUMENTS

| | | | |
|---|---|---|---|
| 3,529,528 | 9/1970 | Heitz | 354/25 |
| 3,762,294 | 10/1973 | Kosaka et al. | 354/25 |
| 3,953,863 | 4/1976 | Lang | 354/25 |
| 4,047,022 | 9/1977 | Holle | 354/25 X |

FOREIGN PATENT DOCUMENTS 1218804  1/1971 United Kingdom ...................... 354/56

Primary Examiner—Michael L. Gellner
Attorney, Agent, or Firm—James E. Nilles

[57] ABSTRACT

Disclosed is an apparatus adapted to be used in a single lens reflex camera for detecting whether a correct focal adjustment has been made. The apparatus includes a pair of focal point detecting optical systems placed relative to each other on symmetrical positions with respect to an extending optical axis which is turned by an optical reflecting means, at the rear of a semitransparent movable mirror. A position where an image of an object on a main optical axis of the object lens, is focused by said object lens when an observing point of the object is placed in a position with an infinity distance, is determined as a basic point. The optical axes of said pair of focal point detecting optical systems cross with each other at said basic point. A photo-electric detecting plate is arranged in the vicinity of a film surface. A position on said detecting plate where an image of the object on said basic point is projected by said focal point detecting optical systems is determined as a cardinal point. A correct focusing is detected electrically when the observing point of the object is projected onto said cardinal point.

3 Claims, 7 Drawing Figures

APPARATUS FOR DETECTING FOCAL POINT

The present invention relates to an apparatus adapted to be used in cameras, for detecting the focal point.

In recent years, a variety of cameras having focal point detecting apparatus have been proposed, presenting various methods of detecting the focal point.

These proposed methods are, for example, to evaluate contrast between a focused image and non-focused image, to analyze frequencies of waves provided by a vibration or a scanning of a slit provided on a focal plane, to detect non-linearity of an output from an image formed on a photo-conductive body, to analyze a light reflected by the object and so on.

However, these conventional methods fall short of providing satisfaction for the current demand of reducing the weight and size of the camera, for various reasons, when the camera is to be equipped with an automatic focal point detecting apparatus.

Namely, the method relying upon the contrast between the focused and non-focused images has a drawback such that it is difficult to make the contrast correctly correspond to the focusing by the object lens, when the light incident conditions to the focal point detecting apparatus and to the object lens are not equivalent.

The second mentioned method relying upon the vibration or scanning of a slit requires a specific mechanism for performing the scanning and the vibration.

The third mentioned method also necessitates specific means for detecting the non-linearity of the output.

The method of apply a light or ray to the object to measure the incident angles of the reflected light and a standard light also requires a conplicated system.

Recent remarkable progress in development of photo-electric converting elements provides excellent and compact elements, which affords a focal point detecting apparatus of the double-image matching type.

The most basic one of this type has been disclosed in Japanese Patent Application Publication No. 24153/64, while an improved modern apparatus of this type is shown in Japanese Patent Laid-open No. 39543/75.

These newly proposed methods consist in applying the incident light coming from an object to the camera onto a detecting means having at least a pair of elements. The arrangement is such that separately provided controlling means are adapted to issue a signal representative of correct focusing, when the image distributions on the elements are materially the same relative to each other. Driving means are provided for moving the object lens to the focusing position, in accordance with the signal from the controlling means.

However, since these methods relying upon the double-image matching system employ a specific lens system, in addition to the object lens, so as to receive the incident light from the object independently of the object lens, the whole mechanism of the camera has been rendered impractically complicated.

In addition, the focal point detecting apparatus of this type inconveniently requires a troublesome lens adjustment, for each time of the replacement of the object lens.

It is therefore an object of the invention to provide an improved focal point detecting apparatus of the double-image matching type having an improved accuracy, which can easily be mounted in conventional single lens reflex camera, without substantially modifying the latter, so as to achieve a further simplification of the operation of the camera.

The focal point detecting apparatus of the double image matching type has advantageous features over the aforementioned conventional methods, e.g. higher durability, compactness, smaller weight, simplification of construction, higher speed of the focal point detection, enhanced accuracy, mass-producibility and so on.

In this connection, it will be recalled that the most keen demand for single lens reflex camera is to minimize the size, i.e. to make the camera compact.

For the reason stated later, an image forming optical system for focal point detection has to be installed along a relatively long path of light.

This is the reason why the focal point detecting apparatus is arranged at the bottom portion of the camera between a film and a semitransparent movable mirror which ensures a relatively large space therearound. Thus, in the method as mentioned above, the difficulty in arranging the focal point detecting apparatus is further increased, as compared with the case of an automatic exposure device (AE system), in which consideration must be paid to the positioning of only the photoelectric elements. The requirements as mentioned below for the function of the focal point detecting apparatus will increase the difference and enhance the difficulty, as compared with the AE system.

According to the invention, images are formed on at least a pair of photo-electric converting elements. The difference in the manner of distribution of the images on the elements are detected to examine whether the focusing is correct or not. Therefore, the distribution of the image has to displace exactly in correspondence with the change of the incident angle of the light from the object.

In order to give a solution to the above stated problem, according to the invention, the light coming through the object lens is projected on the surfaces of the photo-electric converting elements of the detecting means, through an image forming optical system having a convex lens.

Thus, the displacement of the image due to the change in the incident angle is determined by the magnification of the convex lens in the image forming optical system. Therefore, the accuracy of the detection is increased, as the distance between the surface of the convex lens and the photo-electric converting element is increased.

Figure 5:
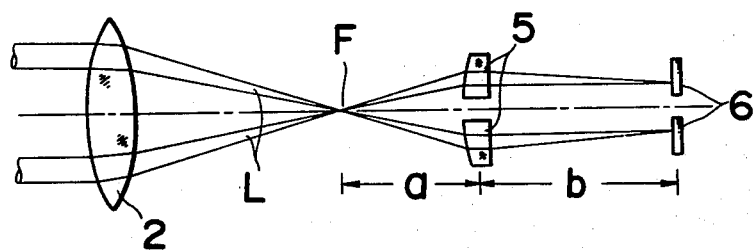

For this reason, in the apparatus of the invention, the distance a between the object lens and the focal point F is made much smaller than the distance b between the object lens and the focal point detecting means 6, as will be seen from FIG. 5 which shows an exploded view of the optical system constituting a basic form of the invention.

In addition, since the present invention relies upon a pair of detecting elements on which the images are formed, for the purpose of comparison, there elements are disposed in symmetry with each other with respect to the optical axis.

Thus, the present invention is aiming at enhancing the accuracy of focal point detection of the recently developed double-image matching type detection apparatus, and to make it possible to mount this type of apparatus in a compact manner, overcoming above described difficulties.

To these ends, according to the invention, there is provided an apparatus for detecting the focal point comprising a semitransparent movable mirror, through which a part of the incident light from the object lens is passed, an optical reflecting means disposed at the bottom portion of the camera between a film and said semitransparent movable mirror and at the back of said mirror, so as to extract the part of light out of the light path of the optical exposure system, an image forming optical system having two image forming lenses for forming a first and a second image from the light extracted as above, and detecting means adapted to detect the difference in distribution of the first and the second image and to provide a signal representative of the difference. The optical reflecting means, image forming optical system and the detecting means are suitably arranged at the bottom portion of camera between the film and said mirror, where the incident light at the exposure is not disturbed.

Figure 2:
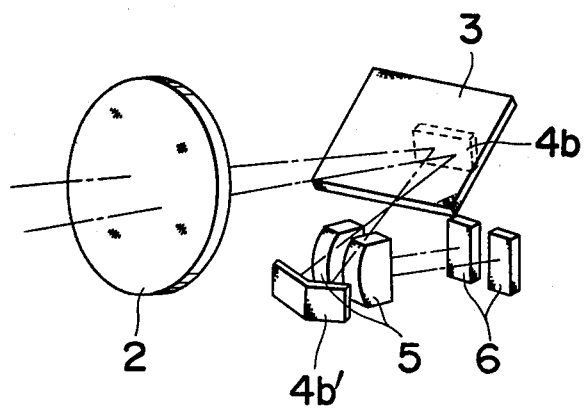
Figure 3:
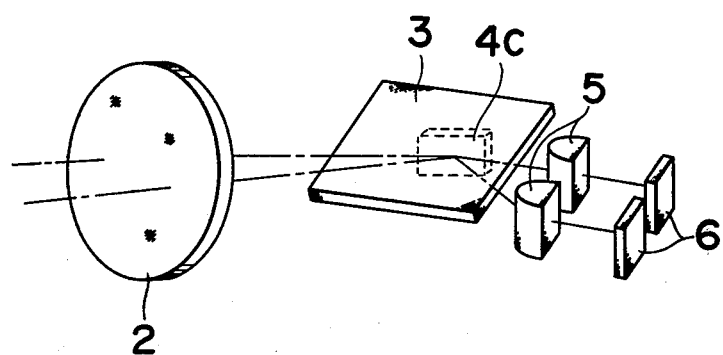
Figure 4:
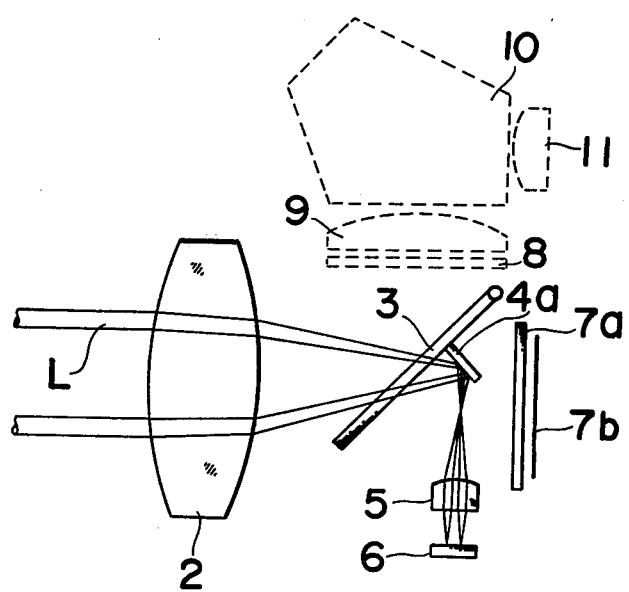
Figure 6:
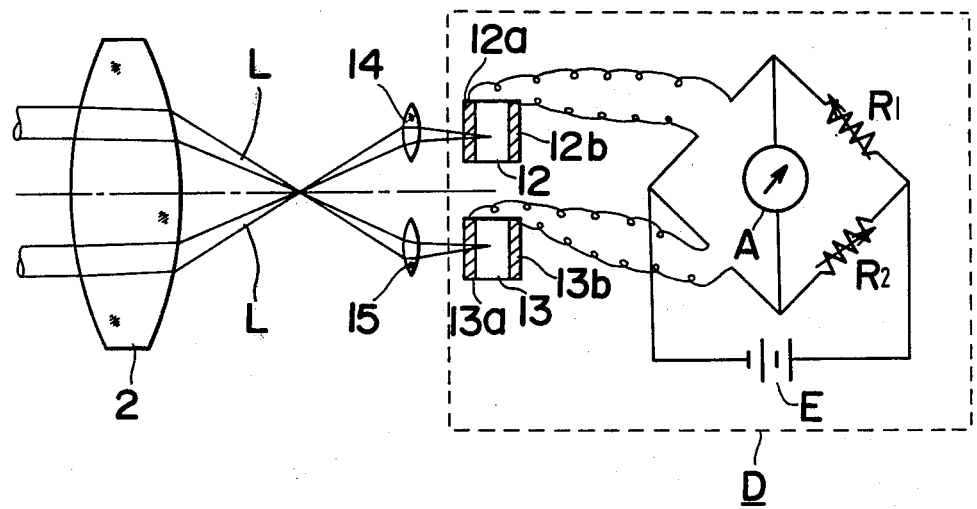
Figure 7:
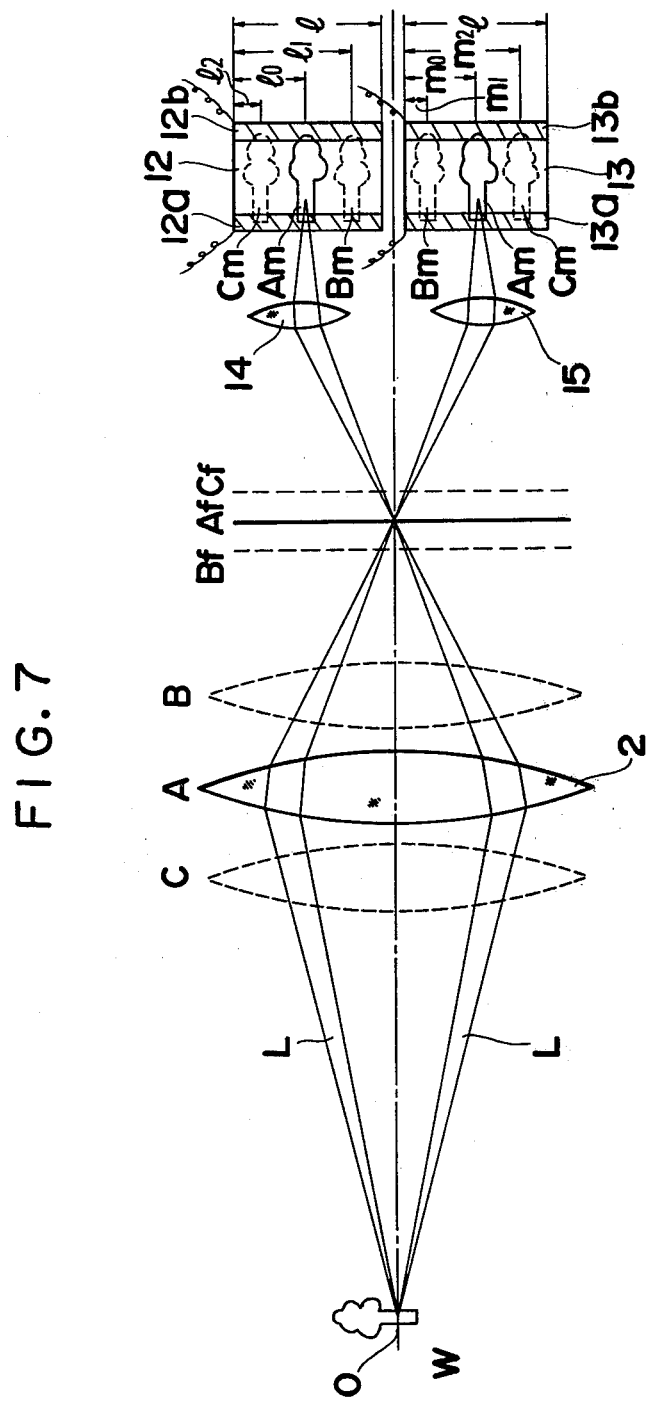

These and other objects, as well as advantageous features of the invention will become more clear from the following description of the preferred embodiments taken in conjunction with the attached drawings in which:

FIG. 1 is an illustration for explaining a first embodiment of the present invention, FIG. 2 is an illustration for explaining a second embodiment of the present invention, FIG. 3 is an illustration for explaining a third embodiment of the present invention, FIG. 4 is an illustration for explaining a fourth embodiment of the invention, FIG. 5 is a plan view of example of an image forming optical system, FIG. 6 is an illustration showing an example of a focal point detecting means, and FIG. 7 is an illustration for explaining the positions of images on focal point detecting elements and the object lens.

Referring to the drawings, numerals 1, 2 and 3 designate, respectively, a camera body, an object lens and a movable half mirror, whereas numeral 4a, 4b, 4b' or 4c denotes a reflecting mirror arranged at the back of said movable mirror 3 or the lower portion thereof for projecting the incident light to convex lenses 5 for forming images.

A pair of photo-electric converting elements 6 of a rectangular shape with opposing sides constituting electrodes form focal point detecting means and receive the light coming from said convex lenses 5. In FIG. 4, numeral 7a denotes a shutter, 7b a film surface, 8a focusing screen, 9a a condenser lens, 10a a pentaprism, and 11 an eye piece. In FIG. 6, reference D denotes a detecting means. This means includes two elements 12, 13 (which are the same with the photo-electric converting means 6) adapted to become conductive when light is applied and having respective opposing electrodes 12a, 12b and 13a, 13b. The detecting means further includes variable resistances $R_1$, $R_2$ and an idicating meter A. The elements 12, 13, variable resistances $R_1$, $R_2$ and the meter A are electrically connected to form a bridge, as shown in FIG. 6.

Numerals 14, 15 denote image forming lenses.

Symbol L represents a bundle of light coming from the object into the detecting means.

In FIG. 7, reference W denotes an object and O denotes a position of said object W. A, B, C represent positions of the adjustable object lens 2, respectively. $A_f$, $B_f$, $C_f$ represent positions of focused images corresponding to said positions A, B, C of the object lens 2, repsectively. $A_m$, $B_m$, $C_m$ represent images of said object W formed by the image forming lenses 14, 15, respectively. Distances between one end (upper end in FIG. 7) of said elements 12, 13 and said images $A_m$, $B_m$, $C_m$ are ($l_o$, $m_o$) ($l_1$, $m_1$), and ($l_2$, $m_2$), respectively. The focal point detecting apparatus of the present invention will now be explained with reference to an embodiment shown in FIG. 7.

The images $A_m$ of the object W are formed by the lenses 14, 15 when the object lens 2 is positioned on A and the focused image of the object W is formed on the position $A_f$. In this state, a film is arranged on a position equivalent optically to the position $A_f$ and the elements 12, 13 are arranged on positions where the images $A_m$ are formed at the centers of said elements 12, 13, respectively, namely, on positions where the distance $l_o$ is equal to l/2. The resistances of respective elements 12, 13, which are determined by the positions of the images become equal with each other only when the center portion of the image is formed on a position where the distance $l_o$ is equal to l/2, because the positions of the images on the elements 12, 13 are varied by moving the object lens 2 with the same distances from the optical axis with each other. When the resistances of the elements 12, 13 become equal, the difference between the electric signals of the elements 12, 13 becomes zero or nearly zero and a signal representative of the focusing is provided. If the object lens 2 is positioned on B or C, the image of the object W is formed on the position $B_f$ or $C_f$ and the images $B_m$ or $C_m$ are formed by the lenses 14, 15 on the positions each other symmetric with respect to the optical axis. In this state, a large difference signal showing such a state that the image of the object is not focused is generated, because the distance $l_1$ becoms larger than the distance $m_1$ with respect to the image $B_m$ and $m_2$ becomes larger than $l_2$ with respect to the image $C_m$, respectively. The signals generated by the elements 12, 13 are detected by the meter A in the bridge circuit shown in FIG. 6.

Since the images on the elements 12, 13 are the congruence, the resistances residing in the elements 12, 13 can be regarded as identical. Thus, the signal represented by the meter A materially depends on the change of resistance attributable to the difference in the length of the electrode of the focal point detecting element (the length from the upper end of the element).

An illuminating device may be associated with the point of the meter A to act at the time when the image is focused, so as to provide the focusing display in accordance with the movement of the object lens back and forth.

Alternatively, driving means adapted to stop the operation when a correct focusing has been attained is provided, so that the focusing point of the object lens may be automatically detected through the driving means.

The image on the focal point detecting means 6 is preferably a focused one. However, in view of the function of the elements, the image need not to be the focused one.

At the same time, since the image forming lenses 14, 15 have much smaller focal lengths as compared with ordinary object lenses, the resultant focal point is almost identical to that of an image forming lens having a small focal length, so that it is guaranteed that no substantial vagueness is caused by the focal point detecting operation.

In the embodiment shown in FIG. 1, the reflecting mirror 4a arranged at the back of said half mirror 3 is inclined at 45° with respect to the incident light. The convex lenses 5 and the focal point detecting means 6 are arranged at the bottom portion of camera under the half mirror 3 so as not to disturb the light path of the optical exposure system.

In the embodiment shown in FIG. 2, the reflecting mirror 4b is provided at the back of the half mirror 3 and inclined suitably and images of the object are formed on the focal point detecting means 6, respectively, by projecting the light reflected by said reflecting mirror 4b onto said means 6 through the convex lenses 5 arranged in the vicinity of the film surface 7b. The reflecting mirror 4b' is bent a little at the center line thereof so that a distance between the reflecting mirror 4b' and the means 6 can be reduced.

In the embodiment shown in FIG. 3, the reflecting mirror 4c is provided at the back of the half mirror 3 and inclined at 45° with respect to the incident light and the focal point detecting means 6 are arranged under the half mirror 3 at the side of the camera so as not to disturb the light path of the optical exposure system.

In the above embodiments the several components of the apparatus of the present invention are disposed under the movable half mirror 3 in the excess space other than the light path of the optical exposure system. The under portion of the movable half mirror 3 ensures a relatively large space therearound compared with the other portions in the camera, so that it is easy to arrange the components of the apparatus in the camera and the distance between the convex lens and the element 6 can be made large to ensure a higher accuracy of the focal point detection. Further, as the incident light of high intensity in the vicinity of object lens is used the detecting ability of the focal point can be enhanced. Any effect on the image at the finder can be reduced by using the center portion of the incident light, of which the quantity is normally large.

What is claimed is:

1. A focal point detecting apparatus for a single lens reflex camera which includes an object lens movable along the main optical axis of a light beam of a photo-taking light path, and a movable beam splitter located diagonally on said main optical axis behind said object lens, said focal point detecting apparatus comprising:
reflecting means located behind said movable beam splitter for directing part of said light beam along a light introduction path having a light introduction axis which is transverse to said main optical axis;
a pair of photo-electric detecting plates spaced from said reflecting means and located on opposite sides of said light introduction axis, each plate generating an electric signal in response to an image projected thereon, the value of which signal varies according to the position of said image relative to a cardinal point on said plate, said cardinal point being related to the focal point of said object lens;
a pair of additional lenses, each additional lens being located between one of said plates and said reflecting means on an optical measuring axis which is disposed diagonally relative to said light introduction axis;
said pair of additional lenses being operative to project an image appearing at a basic point on said light introduction axis onto their respective plates, the position of said basic point being determined by the position of said object lens on said main optical axis and the position of said images on said plates relative to said cardinal points being determined by the position of said basic point;
second reflecting means disposed between said reflecting means and said pair of additional lenses;
and a circuit connected to receive and compare electric signals from said pair of plates and to provide an output signal indicative of the relationship between the positions of said images projected thereon relative to the cardinal points of said plates and therefore indicative of the position of said object lens relative to said focal point.

2. Apparatus according to claim 1 wherein said second reflecting means comprises two reflective surfaces disposed at an angle relative to each other.

3. Apparatus according to claim 1 wherein a distance between said additional lenses and said plates is determined to be longer than that between the focal point formed on the light path of light reflected from said reflecting means and said additional lenses.

* * * * *